Oct. 17, 1967 R. M. HOLLINGSHEAD, JR 3,347,069

SECURITY CONTAINER

Filed July 9, 1965 10 Sheets-Sheet 1

INVENTOR.
Richard M. Hollingshead, Jr.
BY
Paul & Paul
ATTORNEYS.

INVENTOR.
Richard M. Hollingshead, Jr.
BY
Paul & Paul
ATTORNEYS.

INVENTOR.
Richard M. Hollingshead, Jr.
BY
Paul & Paul
ATTORNEYS.

INVENTOR.
Richard M. Hollingshead, Jr.
BY
Paul & Paul
ATTORNEYS.

INVENTOR.
Richard M. Hollingshead, Jr.
BY
Paul & Paul
ATTORNEYS.

INVENTOR.
Richard M. Hollingshead, Jr.
BY
Paul & Paul
ATTORNEYS.

INVENTOR.
Richard M. Hollingshead, Jr.
BY
Paul & Paul
ATTORNEYS.

SECURITY CONTAINER

Filed July 9, 1965

10 Sheets-Sheet 8

INVENTOR.
Richard M. Hollingshead, Jr.
BY
Paul & Paul
ATTORNEYS.

INVENTOR.
Richard M. Hollingshead, Jr.
BY
Paul & Paul
ATTORNEYS.

Oct. 17, 1967 R. M. HOLLINGSHEAD, JR 3,347,069

SECURITY CONTAINER

Filed July 9, 1965 10 Sheets-Sheet 10

INVENTOR.
Richard M. Hollingshead, Jr.
BY
Paul & Paul
ATTORNEYS.

3,347,069
SECURITY CONTAINER
Richard M. Hollingshead, Jr., 1144 Red Rose Lane, Villanova, Pa. 19085
Filed July 9, 1965, Ser. No. 473,560
5 Claims. (Cl. 70—63)

ABSTRACT OF THE DISCLOSURE

A container for the storage of personal valuables having a code lock, which is selectively recordable when the container is open, and which incorporates means for setting a selected code into the code lock, when the container is closed.

This is a continuation-in-part of application Serial No. 422,364 now abandoned filed Dec. 30, 1964.

This invention relates to security containers and the like, and more particularly relates to a compact receptacle for the safe storage of personal valuables by guests in hotels, motels and the like.

Itinerant guests sojourning at hotels, motels and the like often wish to be provided with a safe and convenient method of protecting their personal valuables. It is frequently time consuming and inconvenient for travelers to deposit personal valuables with the management that provides their accommodations. Further, users of public accommodations often are reluctant to trust their valuables to a conventional strong box, if access thereto is possible by a large number of persons on the management staff.

It is the primary object of this invention to provide a container having selectively codeable combination type lock which can be easily, conveniently, and selectively coded, and which will respond only to the code selected until recoded.

It is a further object of this invention to provide a security container having selectively codeable locking means and means whereby each code selected is automatically set into the lock upon closure of the container.

It is also an object of the invention to provide a container having selectively codeable locking means and means automatically operative to permit selective recoding of the lock upon opening of the container.

It is a further object of this invention to provide such a container which, while responding only to the code selected by the person temporarily using it, can nevertheless be opened by a key-operated bolt lock.

It is still a further object of this invention to provide a selectively lock codeable for a security container which can be set to any desired combination by its user when the container is unlocked.

It is another object of this invention to provide a combination type lock which can be easily and conveniently set to any previously selected combination, even when unknown, without removing the lock from the security container.

It is also an object of this invention to provide novel means for securing such a security container so as to thwart its theft or other violation of its security.

Other objects will be apparent from the ensuing description of a preferred embodiment of this invention, reference being had to the drawings wherein.

Figures 1, 2, 3:
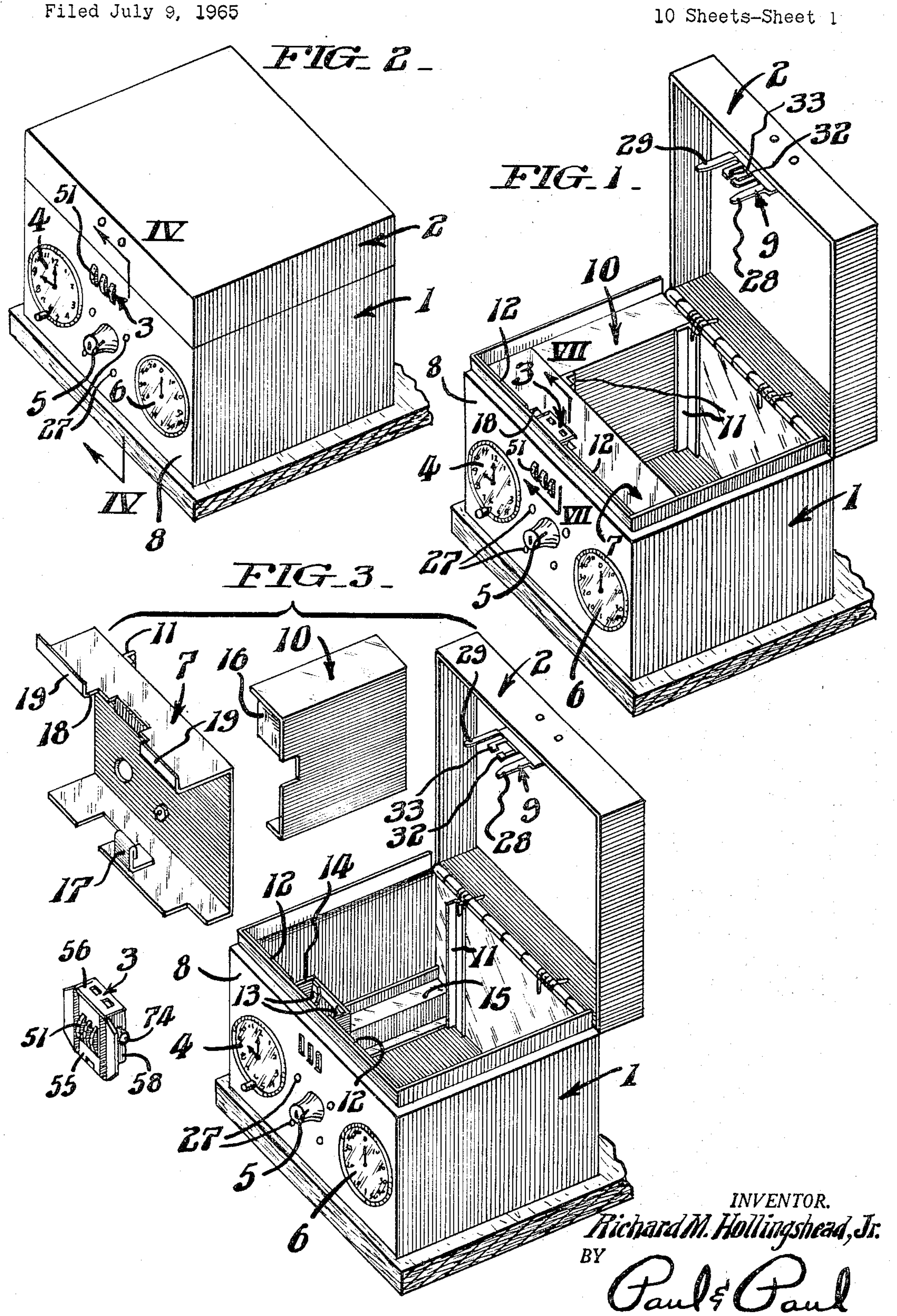
FIGURE 1 is a perspective view of the preferred container of this invention with its lid raised.
FIGURE 2 is a perspective view with the lid closed.
FIGURE 3 is a partially exploded perspective view with the lid raised.

Referring now to FIGURES 1–3 of the drawings, there is shown a security container 1 having a hinged lid 2, codeable combination lock 3, key-operated lock 5, internal security panel 7 and striker plate 9. In addition, other useful features, such as an electric alarm clock 4, a nap timer 6 and a second security panel 10 may be utilized. The conduit for the clock 4 passes through a housing 15 (FIGURE 3) disposed behind panel 10. The panels 7 and 10 serve to protect the locks, clock, timer and housing. Angle irons 11 retain panel 10 in position.

Security panel 7, shown in the exploded view of FIGURE 3, is a U-shaped member formed with an upwardly extending lip 19, a recess 18 intermediate its upper horizontal leg member and a tang 17 located on its lower horizontal leg member. The recess 18 of security plate 7 is adapted to receive lock bracket 14 which, in turn, retains lock 3. The coding wheels 51 of lock 3 protrude outwardly through slots in front panel 8 of the container, as shown in FIGURE 1.

If desired, a self contained, battery operated, burglary alarm (not shown) actuated by a conventional mercury switch (also not shown) may be housed behind security cover 10 in a container 16 (FIGURE 3).

Figure 4:
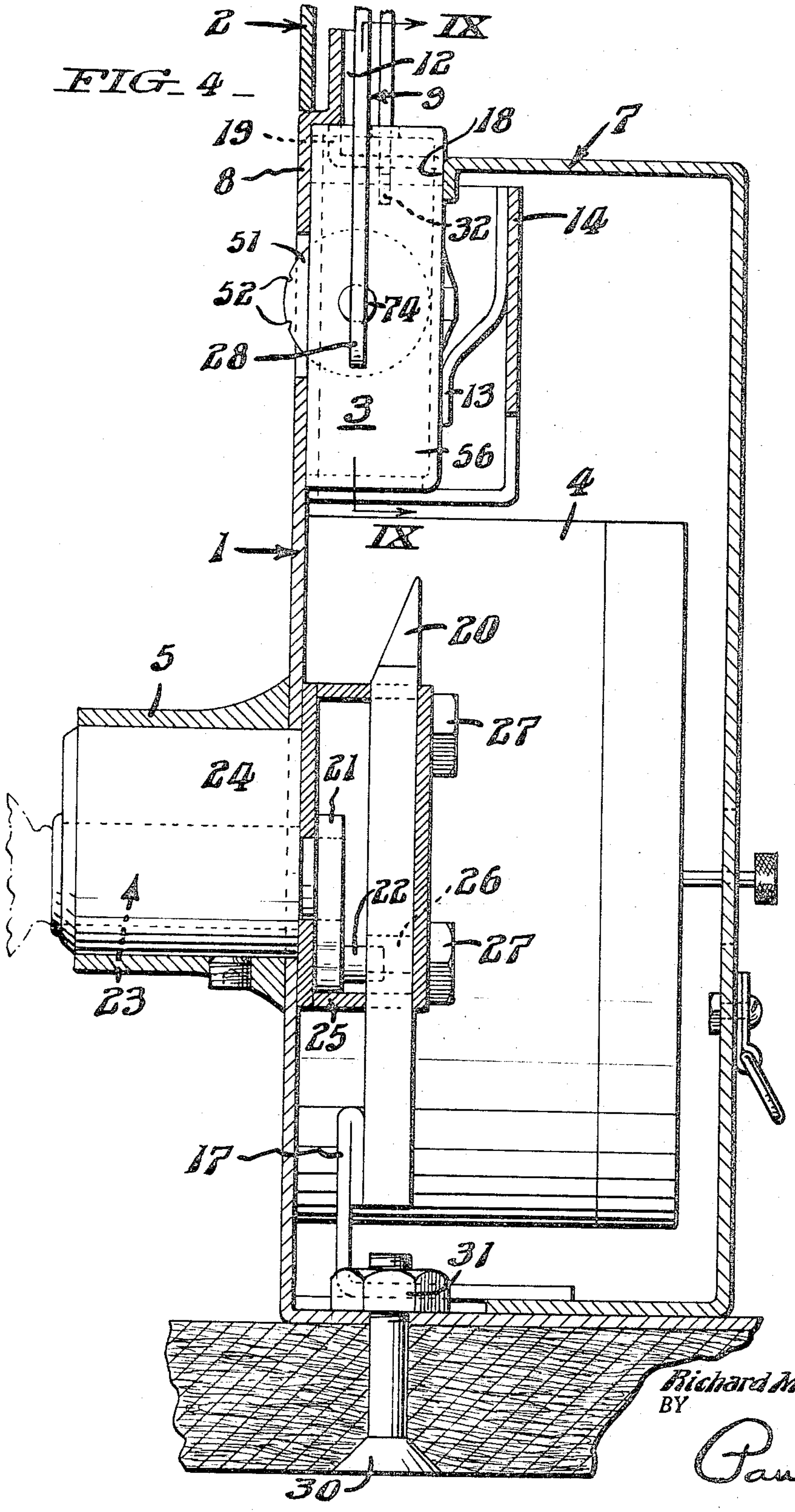
FIGURE 4 is an enlarged fragmentary view in section taken along the angled arrows IV—IV of FIGURE 2.
Figure 5:
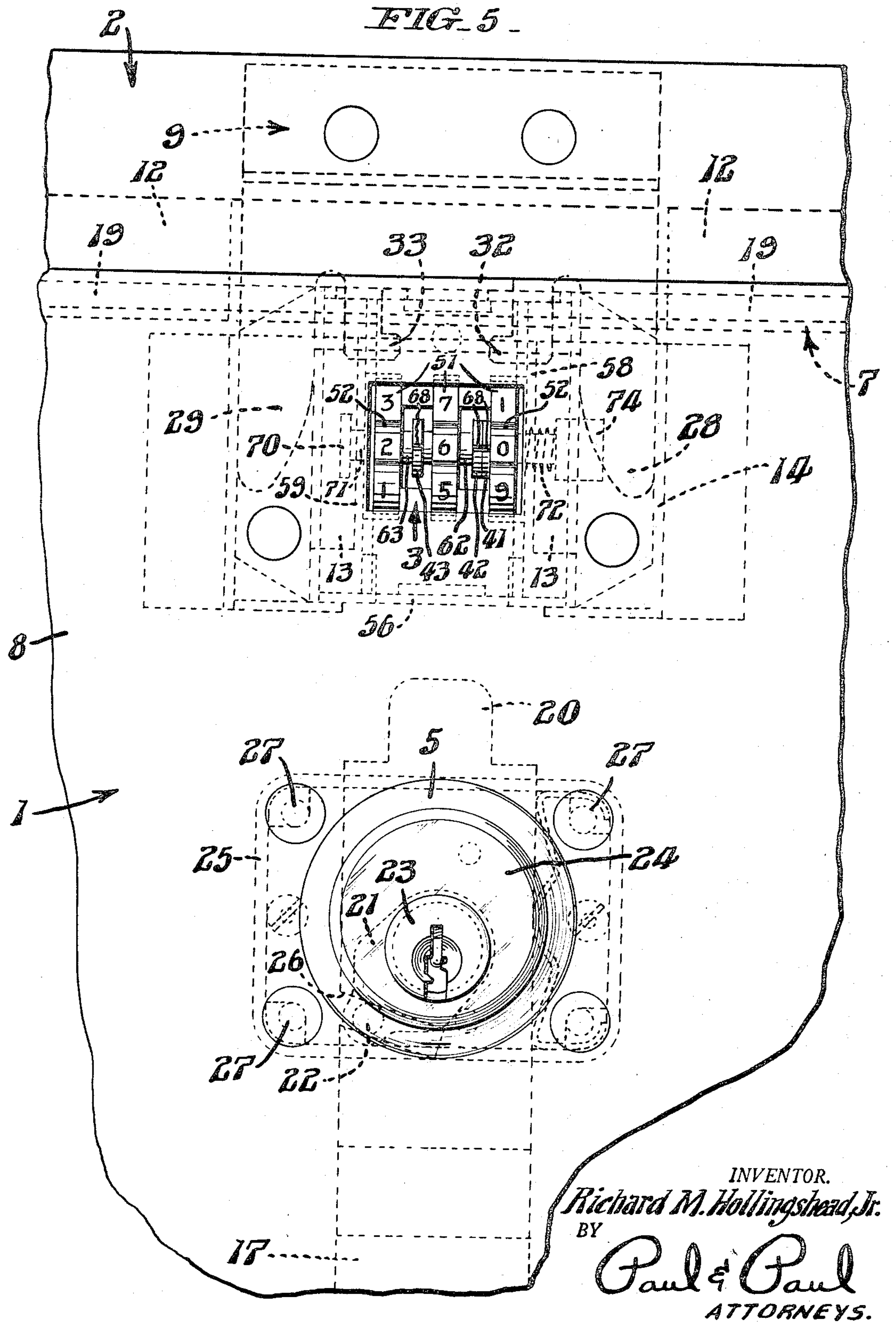
FIGURE 5 is an enlarged fragmentary view in front elevation with the lid closed.

Referring now to FIGURE 4, it will be seen that the key-actuated bolt lock 5 includes a turnable barrel 23 having a key slot extending axially thereof, a cylinder bearing 24 in which the barrel is mounted and a cam 21 affixed to the inner end of the barrel 23 and having an offset pin 22 engaging into a slot 26 in a vertically slidable bolt 20. Bolt 20 is slidably disposed in a bracket 25 affixed in any suitable manner, as by means of rivets 27, to the front panel 8 of the container 1. When the proper key is inserted into the slot of barrel 23 and turned, the barrel is turned about its axis, causing pin 22 to elevate or depress bolt 20.

Security panel 7 is held in the position shown in FIGURE 4 by plates 12 and tang 17 when the bolt 20 is depressed. Plates 12 are fastened to the upper inwardly offset portion of front panel 8. Tang 17 is fastened centrally on the upper surface of the bottom horizontal member of security panel 7 and extends vertically upward. The security panel 7 is secured in place behind the front panel 8 by engaging its upwardly extending lip 19 in the recess formed by front panel 8 and the plates 12. The bolt 20 is then depressed to engage tang 17 as shown in FIGURE 4.

The container may be affixed to any convenient surface, such as a bureau top, by means of a bolt 30 and nut 31. In a preferred embodiment, nut 31 is disposed beneath security panel 7, hence is inaccessible when the container is assembled and secured in place.

FIGURES 5–13 illustrate the novel selectively codeable lock for the security container according to this invention. As will be seen in FIGURE 5, the striker plate 9, having tangs 28 and 29 and strikes 32 and 33, is disposed in vertically aligned relation to locks 3 and 5.

Figures 6, 7, 8:
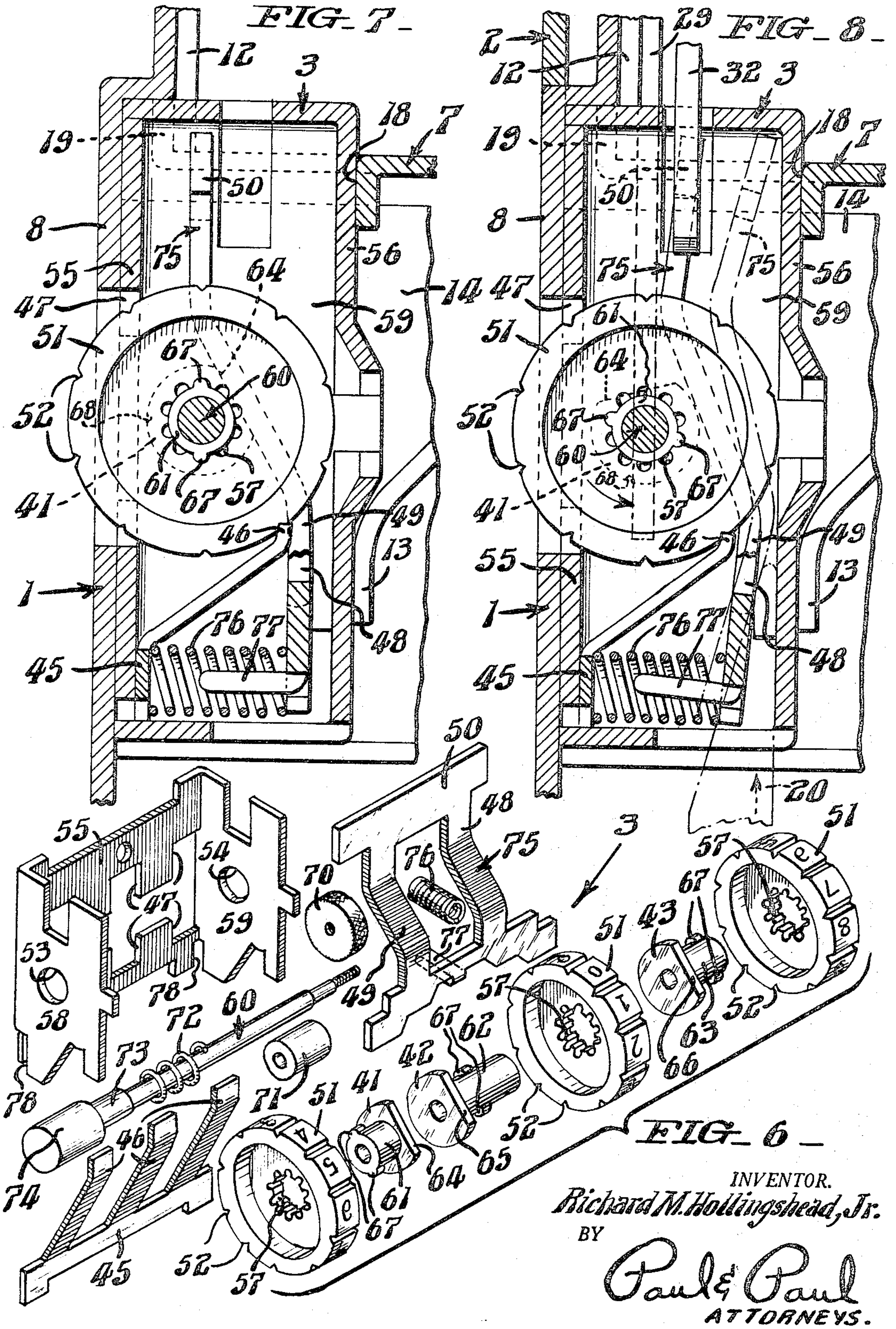
FIGURE 6 is an exploded perspective view of the combination lock assembly.
FIGURE 7 is an enlarged fragmentary view in section taken along the angled arrows VII—VII of FIGURE 1.
FIGURE 8 is a view similar to FIGURE 7, but with the lid closed.

Referring particularly to FIGURES 4, 6 and 7, it will be seen that the bracket 14 for codeable lock 3 is fastened to the front panel 18 of the container by any suitable means. The coding wheels 51 of lock 3 are provided with a plurality of circumferentially spaced notches 52 between which are imprinted coding indicia, preferably numerals from 0 to 9. The wheels 51 are freely mounted on aligned spacers 61, 62 and 63 (FIGURE 6) disposed on an axially retractable pin 60. Each of the spacers 61, 62 and 63 is provided at one end with concentric cams 41, 42 and 43, respectively. Each cam is formed, respectively, with a peripheral flat 64, 65 and 66. Cams 41 and 42 are contiguous. Additionally, each spacer is formed with diametrically spaced cogs 67 adapted to engage within internally formed, concentric recesses 57 in the permutation wheels 51 (see FIGURES 7 and 8).

Figure 11:
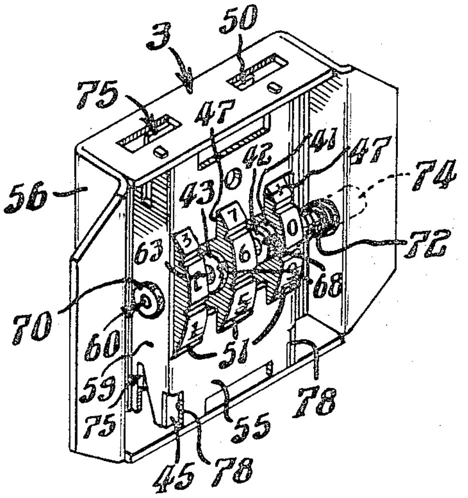
FIGURES 11 and 12 are small scale front and back perspective views, respectively, of the combination lock.

The wheel assembly just described is mounted within a cover plate 55, formed with rearwardly extending side panels 58 and 59 and disposed internally of a box-like casing 56 (FIGURE 11). The lock assembly 3 is securely retained in operative position within bracket 14 by means of leaf springs 13 engaging against the rear of casing 56, as shown in FIGURE 4.

Figure 9:
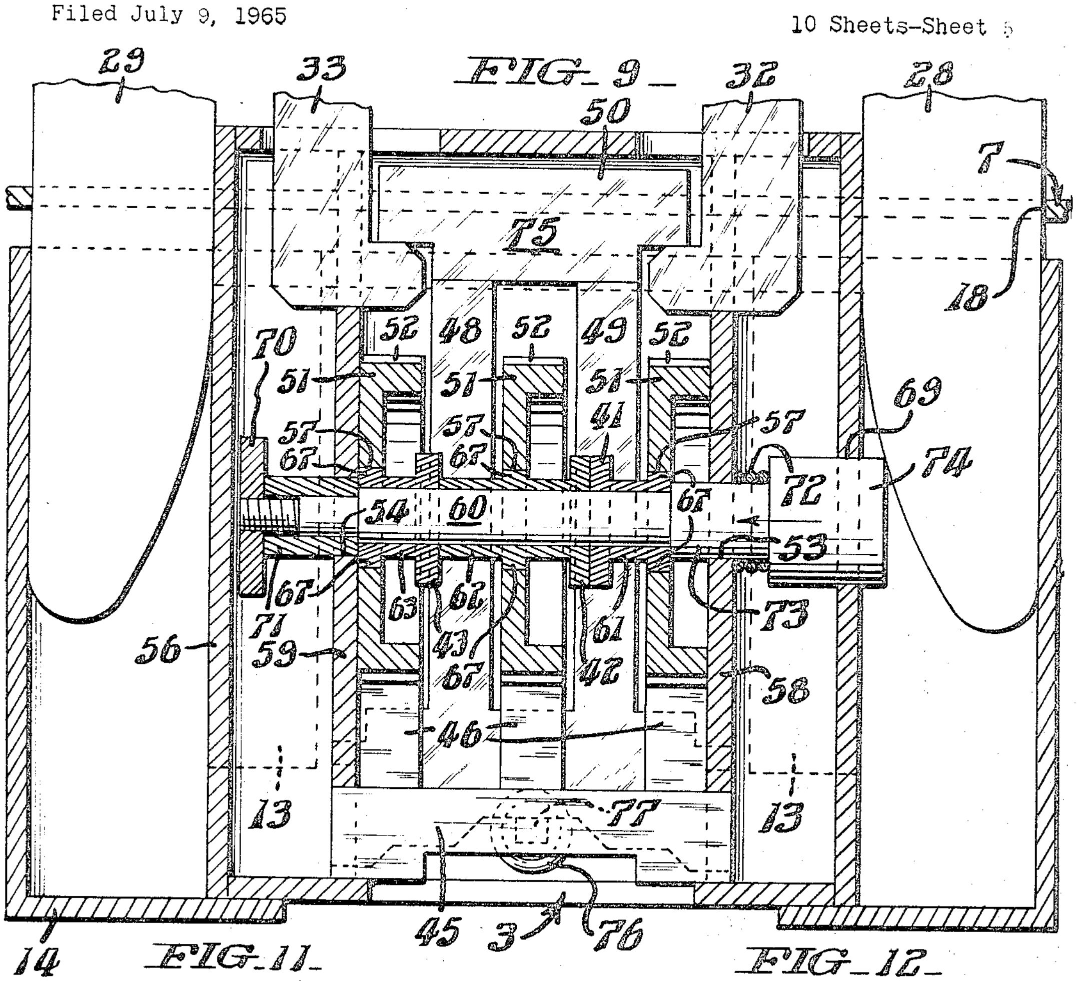
FIGURE 9 is an enlarged sectional view taken along the angled arrows IX—IX of FIGURE 4.
Figure 12:
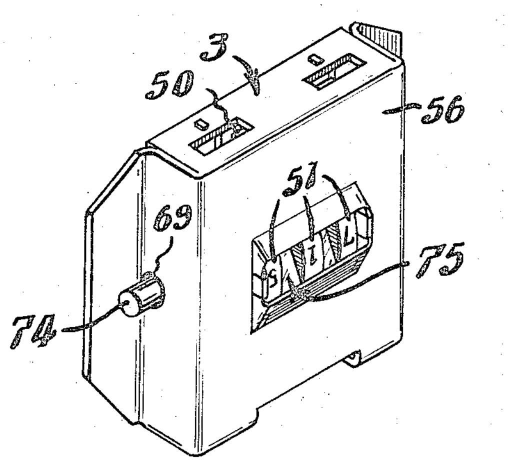
Figure 10:
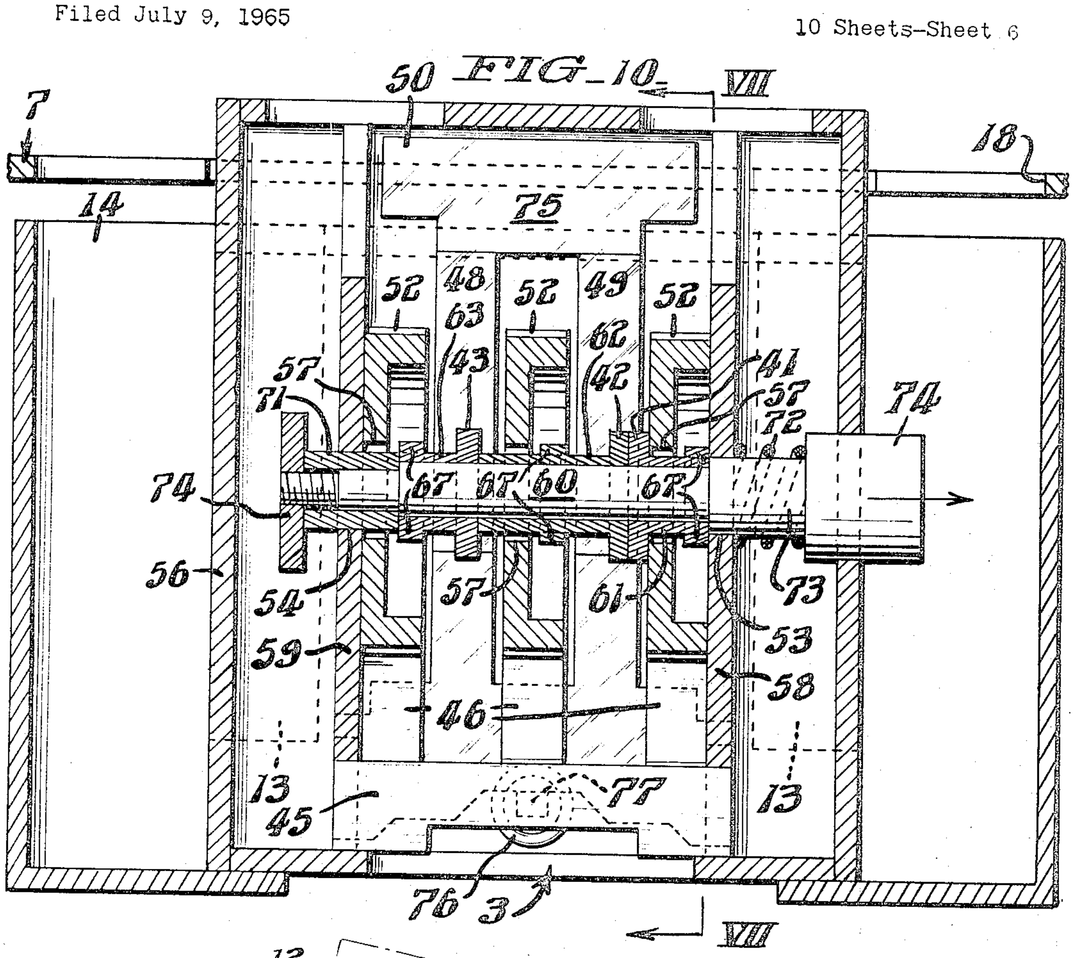
FIGURE 10 is a view similar to FIGURE 9, but with the lid raised.

Side panels 58 and 59 have formed therein axiallyy aligned apertures 53 and 54 for reception of pin 60. Pin 60 is threaded at one end for reception of a nut 70 disposed externally of side panel 59 (FIGURE 9), and is formed at its opposite end with two enlarged portions 73 and 74. Enlarged portion 73 fits slidably within aperture 53. Portion 74 of pin 60 is too large to enter aperture 53, but extends through aperture 69 in casing 56, as shown in FIGURES 9 and 12. A coil spring 72 is disposed about enlarged portion 73 between the shoulder formed by enlarged portion 74 and side panel 58. When nut 70 is fully engaged on pin 60, it bears against a spacer 71 (FIGURE 9), mounted telescopically of pin 60 adjacent spacer 63. When the lock 3 is assembled, spring 72 functions to urge the pin assembly to the right, as shown in FIGURE 10, thereby tending to disengage the cogs 67 from their respective recesses 57 in wheels 51.

The wheels 51, when mounted on their spacers as previously described, are prevented from rotating freely thereon by the engagement of the fingers 46 of detent 45 with notches 52 of wheels 51 (FIGURES 7 and 8). The bottom of detent 45 is retained in notches 78 in side panels 58 and 59. Plate 55 is further provided with retaining slots 47 which prevent lateral movement of the wheels 51.

A coil spring 76 extends from the bottom of detent 45 rearwardly to the bottom of a latch 75, passing about a guide 77 mounted on latch 75. The latch has two spaced leg portions 48 and 49, which extend forwardly and upwardly within casing 56 and terminate in a horizontal cross member 50. The legs 48 and 49 are urged into contiguous relation with cams 43, 42, 41 by the force of spring 76. Since cams 41 and 42 are contiguous, both are engaged by latch leg 49.

When the round portion of any of cams 41, 42 and 43 is disposed against one of the legs 48 or 49 of latch 75, the latch is retracted, against the force of spring 76, as shown in FIGURES 8 and 9, whereby its cross member 50 engages strikes 32 and 33 of the striker plate 9 in locking relationship. More specifically, the inwardly extending right angle portions of the strikes engage the underside of cross member 50, thus locking security container 1. When the flats 64, 65 and 66 of cams 41, 42 and 43 are in aligned relationship and contiguous with latch legs 48 and 49, spring 76 causes cross member 50 to be advanced, about the flats as a pivot, to disengage it from the strikes 32 and 33, as shown in FIGURE 7. This action unlocks lock 3, and permits opening of the container.

One of the more important aspects of this invention is the ability of the codeable lock 3 to be set to any desired unlocking combination when the lid 2 is open.

When the lid 2 is closed, as in FIGURES 8 and 9, tang 28 strikes and laterally moves or cams pin 60 inwardly against the force of spring 72, as shown by the arrow in FIGURE 9, to engage cogs 67 within the recesses 57 in the wheels 51. This records or sets the code selected previously on wheels 51. Subsequent rotation of the wheels 51 will then move latch 75, by the action of cams 41, 42 and 43 (FIGURES 7 and 8), so that latching cross member 50 engages strikes 32 and 33 (FIGURE 9) locking the container 1. The lock 3 is opened by moving the wheels 51 to the recorded code.

When the lid 2 is raised tang 28 on striker plate 9 is disengaged from pin 60. Spring 72 laterally retracts pin 60 to a rest position thereby disengaging cogs 67 from the wheels 51. The wheels 51 can then be rotated freely without disturbing the aligned positions of cam flats 64, 65 and 66 against the legs 48 and 49 of latch 75, as shown in FIGURE 7. The lock is now automatically prepared to receive any new combination which a user may select. The user may select the new combination simply by rotating the wheels to the desired numerical combination.

Subsequent closing of the lid 2 records the newly selected combination in the manner previously described.

If the container 1 is locked and the previously recorded code is unknown, the container 1 can be opened by means of the key for bolt lock 5. Bolt 20 will be elevated between latch 75 and the rear of case 56, as shown in broken lines in FIGURE 8. This forces the bottom of latch 75 outward against the pressure of spring 76, pivoting latching cross member 50 toward the rear of case 56 and out of engagement wtih strikes 32 and 33 of striker plate 9 (FIGURE 8).

Figure 13:
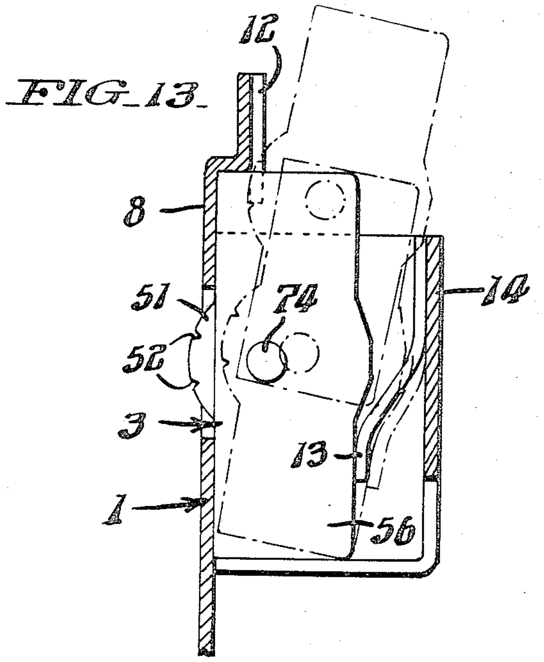
FIGURE 13 is a small scale view similar to FIGURE 7 showing schematically how the combination lock may be removed from its bracket.

If the container 1 has been opened by the bolt lock 5, combination lock 3 must be unlocked before a new code can be set into it. To unlock lock 3, the cam flats 64, 65 and 66 must be placed in contiguous alignment with legs 48 and 49 of latch 75. This can be done by removing lock 3 from housing 14 as shown in FIGURE 13, depressing pin 60 to engage cogs 67 in the recesses 57 of wheels 51, rotating the wheels 51 and observing the alignment of cam flats 64, 65 and 66 through the front of the lock. To simplify this operation, cams 41, 42 and 43 may be provided with notches 68, shown in FIGURE 11, which are positioned so as to be in horizontal alignment when viewed from the front of lock 3 when the lock is unlocked. Thus, spinning the wheels 51 to align notches 68 unlocks lock 3. The lock 3 then is replaced in housing 14 and is ready for selection and recording of any new combination in the manner described.

FIGURES 14 through 20 illustrate a modification of the lock of this invention, which does not need to be removed from the housing 14 to be reset to an unknown, previously selected combination. A sensing member or feeler 44 is provided internally of the lock between latch 75 and detent 45, for engagement with the notches 68 of cams 41, 42 and 43, after the latch 75 has been displaced by the bolt 20. The feeler 44 is provided with spaced, dependent arms 37, lipped at their distal ends adapted to contact the lower portion of latch 75. Feeler 44 also is provided with pivot points 34 and 35, and spaced beveled lipped feeler arms 38 and 39 for engagement with notches 68. Pivot points 34 and 35 are adapted to be received in the holes 36 and 36' of the walls 58 and 59 of cover plate 55.

Figures 15, 16, 17:
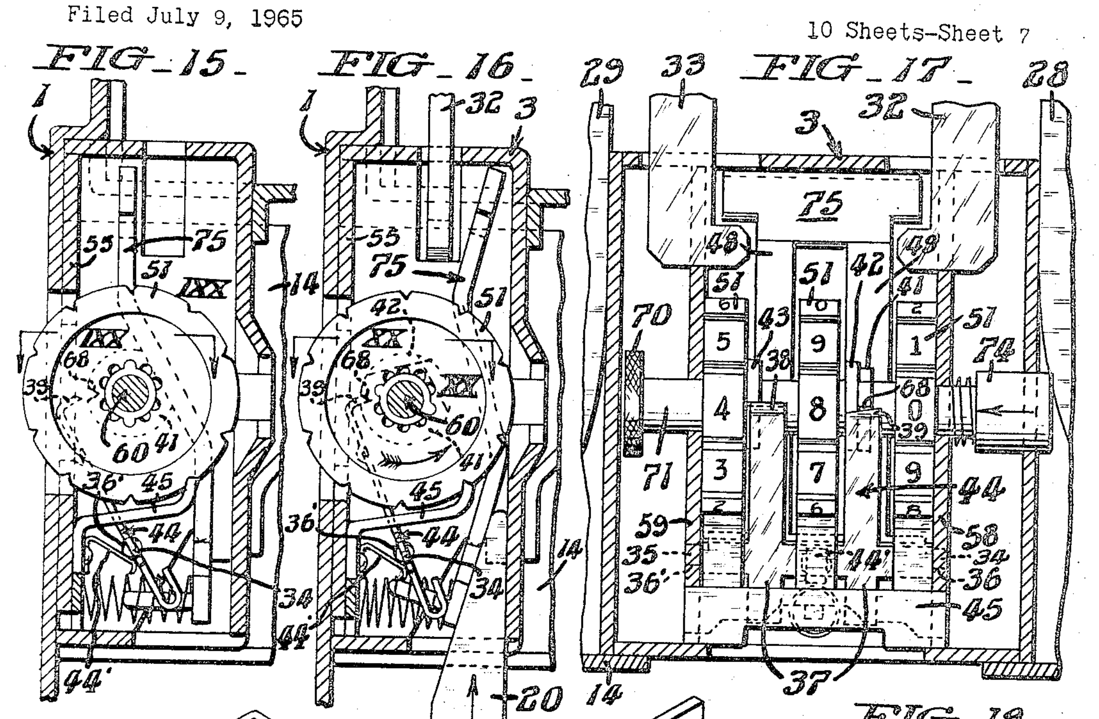
FIGURE 15 is a fragmentary sectioned view similar to FIGURE 7 showing the modification.
FIGURE 16 is a view similar to FIGURE 5 showing unlocking of the modified combination lock.
FIGURE 17 is a partially sectioned view of the modification similar to FIGURE 9.
Figures 14, 18, 19, 20:
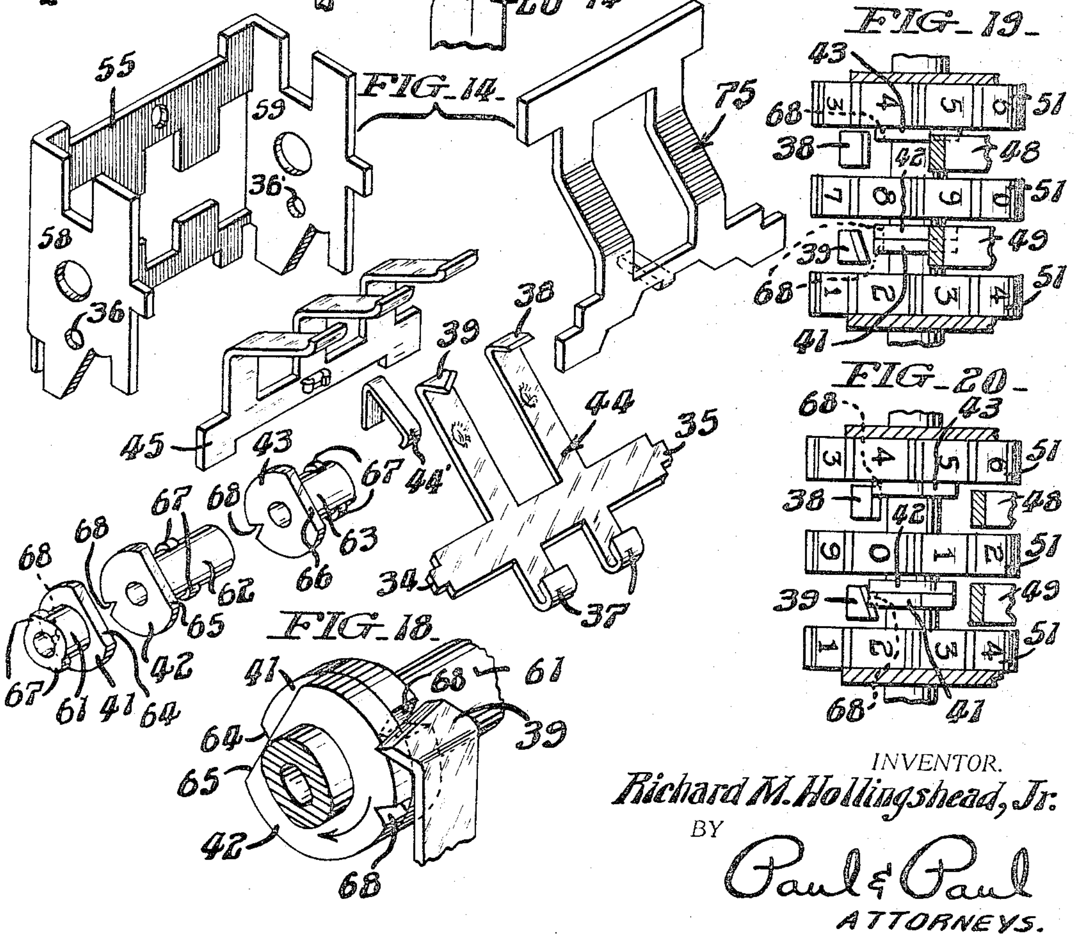
FIGURE 14 is an exploded perspective view similar to FIGURE 6 showing a modification to the combination lock.
FIGURE 18 is a fragmentary perspective view of the modification.
FIGURES 19 and 20 are fragmentary sectioned views taken as indicated by the lines and arrows IXX—IXX and XX—XX in FIGURES 15 and 16 illustrating the modification.

In FIGURES 15 and 19, the modified lock, embodying feeler 44, is shown in the unlocked position. In this condition, the dependent arms 37 of feeler 44 do not bear on the latch 75 and the lips of arms 38 and 39 do not engage the cams 41, 42 and 43. The feeler 44 is held in this position by the force of leaf spring 44' which is attached to detent 45 and bears against feeler 44 below the axis of the pivot points 34 and 35. Feeler 44 remains in this position when the lock is locked.

In FIGURE 16 the combination lock is shown in bolt unlocked condition, where the combination is unknown. Latch 75 bears against the arms 37 of feeler 44, which is pivoted about the axis of the pivot points 34, 35 enabling the lips of feeler arms 38 and 39 to bear on the cams 41, 42 and 43. With feeler 44 thus biased, the lips of arms 38 and 39 will engage the notches 68 in the cams 41, 42 and 43 when their flats 64, 65 and 66 are aligned by rotation of wheels 51. The lid of the security container must remain closed to accomplish this result. Each wheel is turned until it can no longer move, and the lost combination thus is found. The bolt 20 now may be withdrawn and the lid opened. Any new combination may thereafter be inserted into the lock in the manner previously described.

FIGURE 17 shows the position of the feeler 44 when viewed from the front of the lock.

FIGURES 18 and 20 clearly show how first one then another of the notches 68 are engaged by feeler arm 39. The lip of feeler arm 39 is angled so as to engage first the notch 68 of cam 41 and then that of cam 42 as the wheels 51 are individually moved to find the lost combination. The lip of feeler arm 38 terminates in a straight edge for engaging notch 68 of cam 43. Modified as thus described combination lock 3 is capable of being set to an unknown, previously selected code preparatory to having a new combination inserted into the lock. This feature preserves the tamper-proof advantages of the lock box because the unknown combination may be found only by activation of the key-operated bolt lock.

Figures 21, 22, 23, 24:
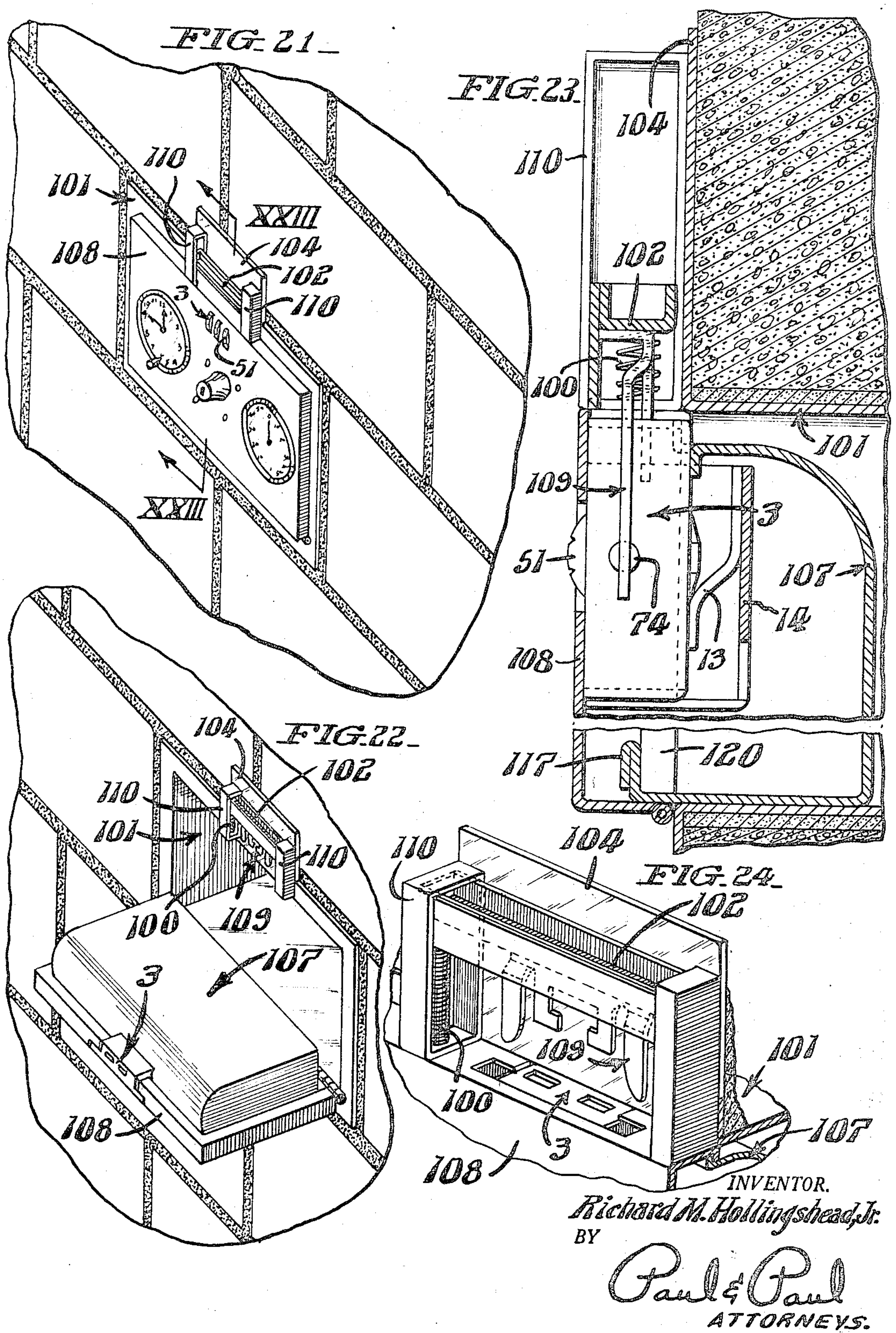
FIGURE 21 is a perspective view of a modification of the container of this invention mounted in a masonry wall.
FIGURE 22 is a view similar to FIGURE 21 showing the container opened.
FIGURE 23 is an enlarged fragmentary view in section taken along the angled arrows XXIII—XXIII in FIGURE 21.
FIGURE 24 is an enlarged perspective view of the striker assembly of the modification of FIGURE 21 in the unlocked position.

In the modification of the invention shown in FIGURES 21–24, the container 101 is fabricated to be installed within a masonry wall. The door panel or lid 108 may contain the same parts as are indicated in the front panel 8 shown in FIGURES 1–3. The striker plate 109 is mounted in a holder 102 which is vertically movable within slides 110 toward and away from the lock 3. A pair of springs 100 urge the holder 102 and striker plate in an unlocked, i.e. elevated position. The slides 110 are attached to a plate 104 extending upwardly from the top of box 101 (FIGURES 23 and 24).

The security panel 107 may be attached to the door panel 108 in a manner similar to that shown in FIGURE 4, as illustrated in FIGURE 23, by pressure fit retention through the cooperation of bolt 120 and tang 117.

Figure 25:
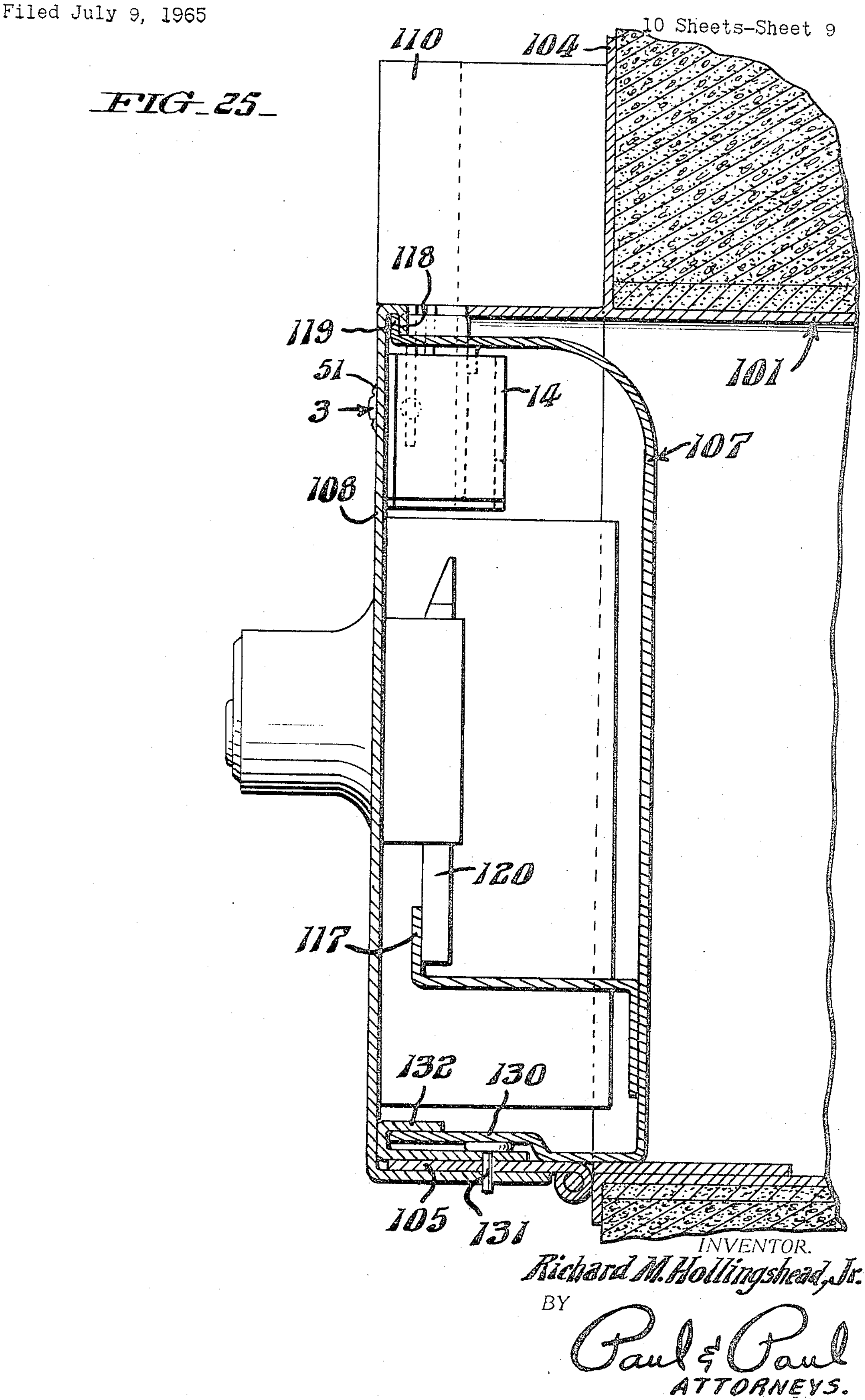
FIGURE 25 is an enlarged sectional view, similar to FIGURE 23, showing a further modification.

A further modification for attaching the security panel 107 may be seen in FIGURE 25, where the base of the panel 107 contains an offset portion 130 which engages within a U-shaped member 132 fastened to the door panel 108. Hinge extension 105 is retained between U-shaped member 132 and door panel 108 by a suitable fastening means 131, which may be bolt, rivet, screw or the like. The security panel 107 is retained in place by the cooperation of tang 117, attached to the security panel, bolt 120, lip 119 and the recess 118 extending along the top of door panel 108.

Figure 26:
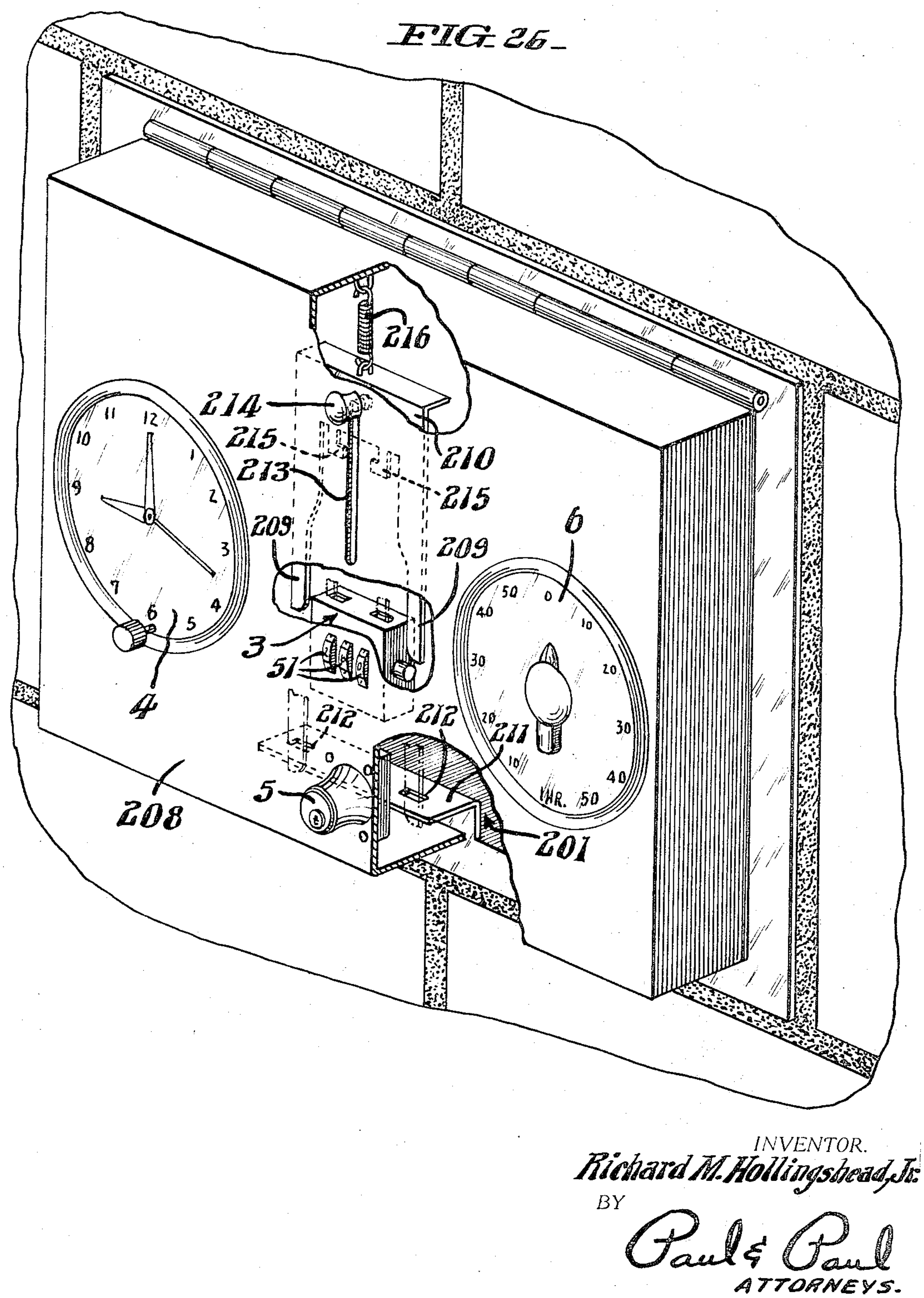
FIGURE 26 is a fragmentary enlarged view in perspective showing still another modification of the security container of this invention.

In the modification of FIGURE 26 the lock 3, bolt lock 5, striker plate 210 and lip 211 fastened to container 201 are located in vertical alignment when the door panel 208 is closed. The striker plate 210 is provided with spaced elongated striker arms 209 which are designed to extend past both sides of codeable lock 3 and bolt lock 5 to engage in slots 212 in lip 211.

In this embodiment the retention of strikes 215 within lock 3 by latch 75 (FIGURE 8) prevent the retraction of the striker arms 209 from the slots 212.

Knob 214, fastened through a slot 213 in lid 208 to striker plate 210, provides means for moving the striker 210 toward the lock 3 for locking the container. When the strikes 215 are not engaged by lock 3, spring 216 returns the striker plate to its unlocked position. This arrangement tends to prevent the lock 3 from being accidentally locked. This modification may be used in place of lid 2 of container 1 in FIGURE 1.

It will be readily apparent that this invention has wide application, and may be adapted to a larger number of possible uses. For example, luggage, clothing lockers, parcel lockers and the like are ideal applications for the novel and unique characteristics of this invention.

Although this invention has been described with respect to particular embodiments thereof, it will be apparent to one skilled in the art that it is capable of various embodiments and modifications not described herein, but which are encompassed within the scope of the appended claims.

Having thus described my invention, I claim:

1. In a container having relatively movable components, said components being adapted to be advanced relatively toward each other to close the container and to be retracted relatively from each other to open the container, (a) a striker plate on one component for engaging with striker plate retaining means on the other component to secure the two components in locked relationship when the container is closed,
(b) a code lock mounted on one of the components,
(c) said code lock having automatic means permitting selectively coding of the lock when the components are relatively retracted from each other,
(d) decoding means in the code lock and
(e) key lock means adapted to unlock the code lock and actuate the decoding means preparatory to selecting the proper unlocking code for the code lock.

2. In a container having relatively movable components, said components being adapted to be advanced relatively toward each other to close the container and to be retracted relatively from each other to open the container, (a) a selectively codeable lock,
(b) a striker plate having strikes adapted to enter the lock when the container is closed,
(c) a retractable latch disposed fithin the lock,
(d) said latch being engageable with the striker plate strikes to secure the two components in locked relationship when the container is closed,
(e) recording means for the lock,
(f) means automatically operative to render the lock selectively recodeable when the strikes are withdrawn from the lock and
(g) means automatically operative to set a selected code into the lock upon entry of the strikes into the lock.

3. The container of claim 2 further including (a) coding wheels for unlocking and for recoding the lock, (b) cams associated with the coding wheels for controlling the latch, (c) means connecting the cams to the coding wheels when the strikes are disposed within the lock and (d) means automatically operative to disconnect the cams from the coding wheels when the strikes are withdrawn from the lock.

4. In selectively codeable locking means having key controlled means for unlocking the codeable locking means regardless of the code selected, (a) feeler means disposed within the locking means for determining the selected code when the key controlled means is utilized to unlock the locking means and (b) means for retaining the feeler means inoperative when the key controlled means is inoperative.

5. A code lock for a container having a lid-like component adapted to be advanced to or retracted from the container to close and open the same, said lock incorporating (a) means automatically operative to render the lock selectively recodeable when the lid-like component is retracted from the container and (b) means automatically operative to set a selected new code into the lock upon closure of the container.

References Cited

UNITED STATES PATENTS

| | | | |
|---|---|---|---|
| 146,191 | 11/1874 | Kock. | |
| 1,644,650 | 10/1927 | Millice. | |
| 1,946,028 | 2/1934 | Meilink | 70—1.5 X |
| 2,136,493 | 11/1938 | Denerich | 70—156 X |
| 2,144,047 | 1/1939 | Eden | 70—315 X |
| 2,580,830 | 1/1952 | Pelle | 70—285 |
| 2,706,393 | 4/1955 | Jamieson et al. | 70—63 X |
| 3,034,329 | 5/1962 | Pitney et al. | 70—316 X |
| 3,237,434 | 3/1966 | Jackes et al. | 70—285 X |

BOBBY R. GAY, *Primary Examiner.*